Feb. 17, 1925.
T. R. GRIFFITH
OIL WELL TOOL
Filed Jan. 9, 1924
1,527,130
4 Sheets-Sheet 2
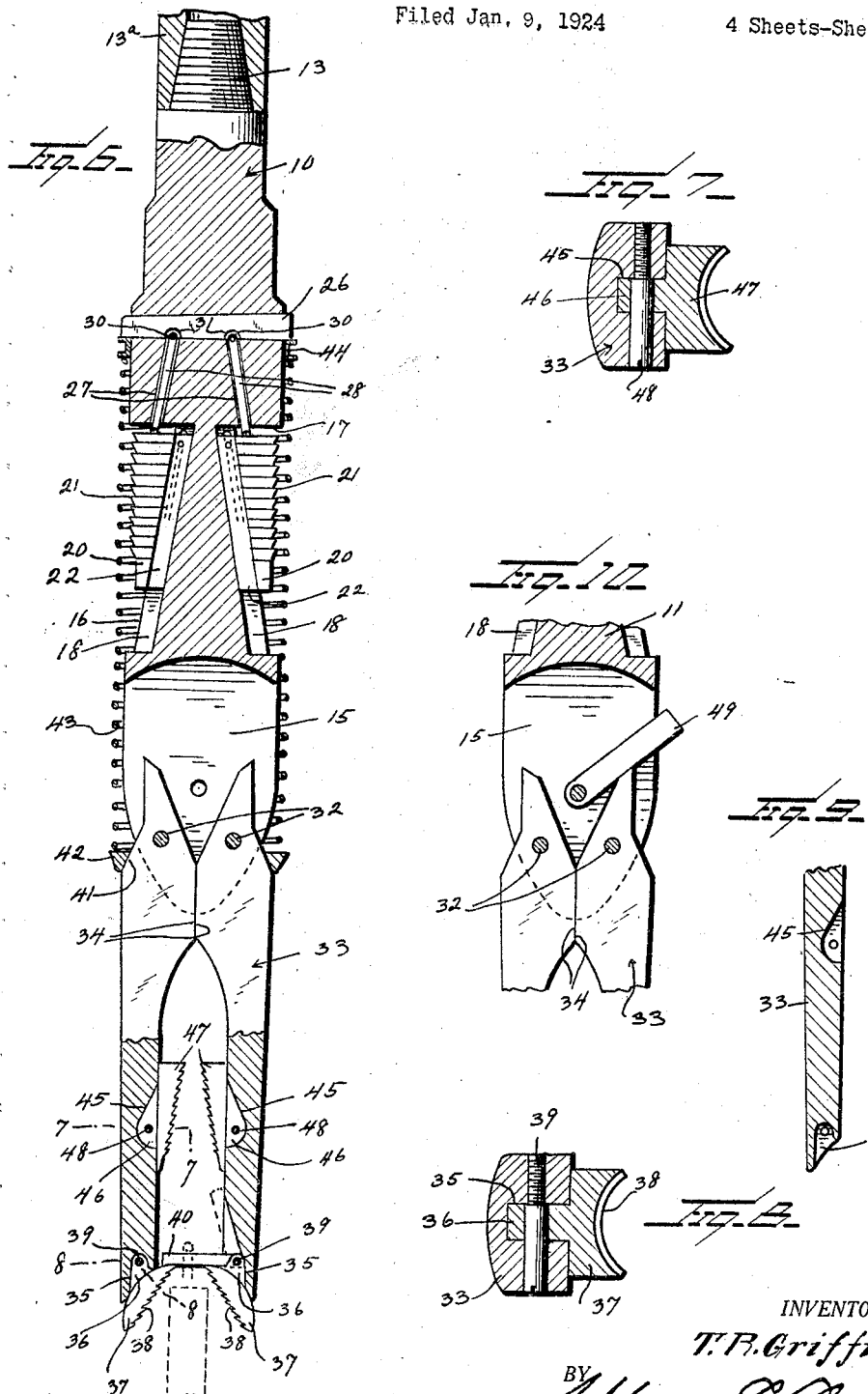
INVENTOR.
T. R. Griffith
BY Watson E. Coleman
ATTORNEY.

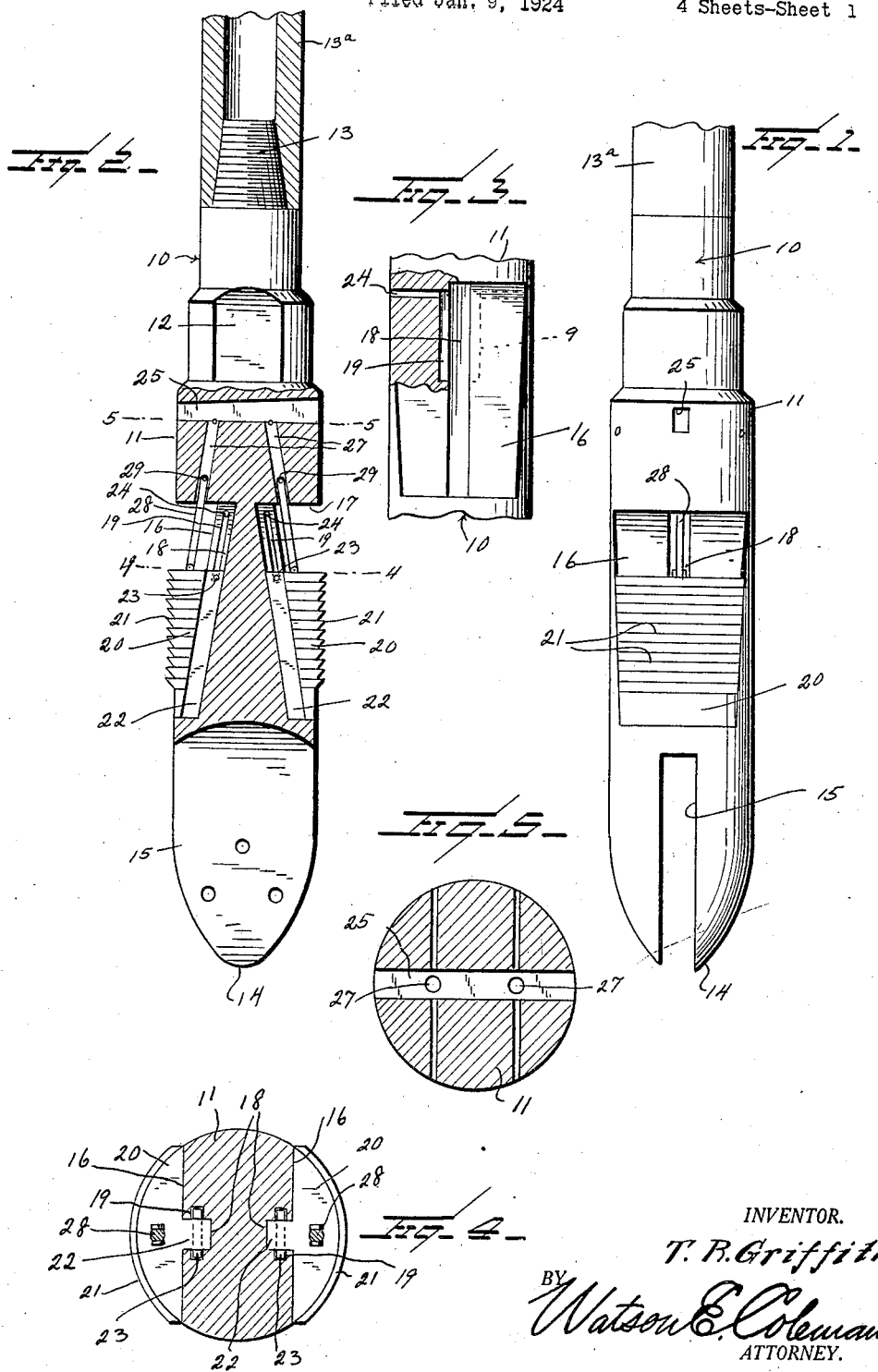

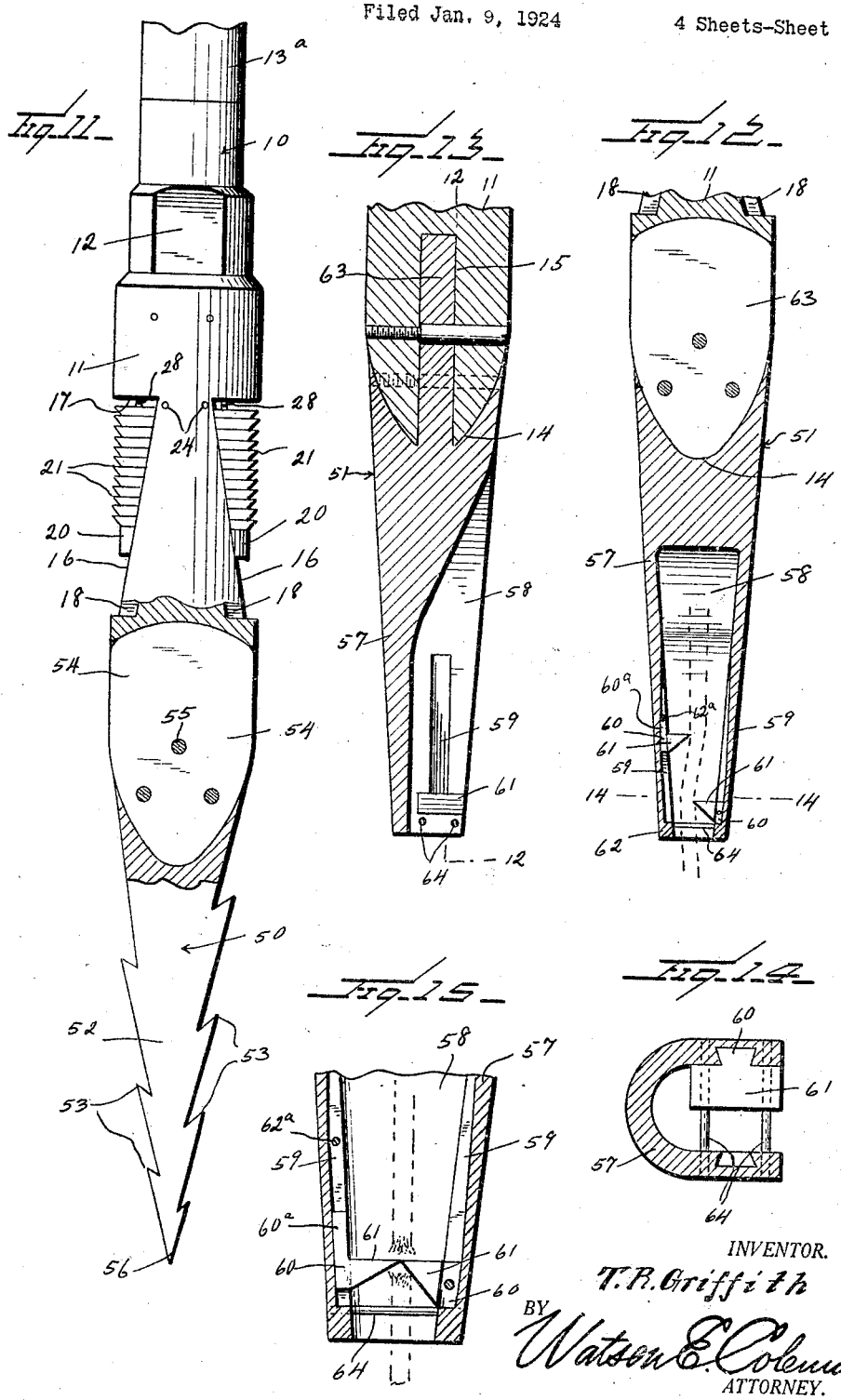

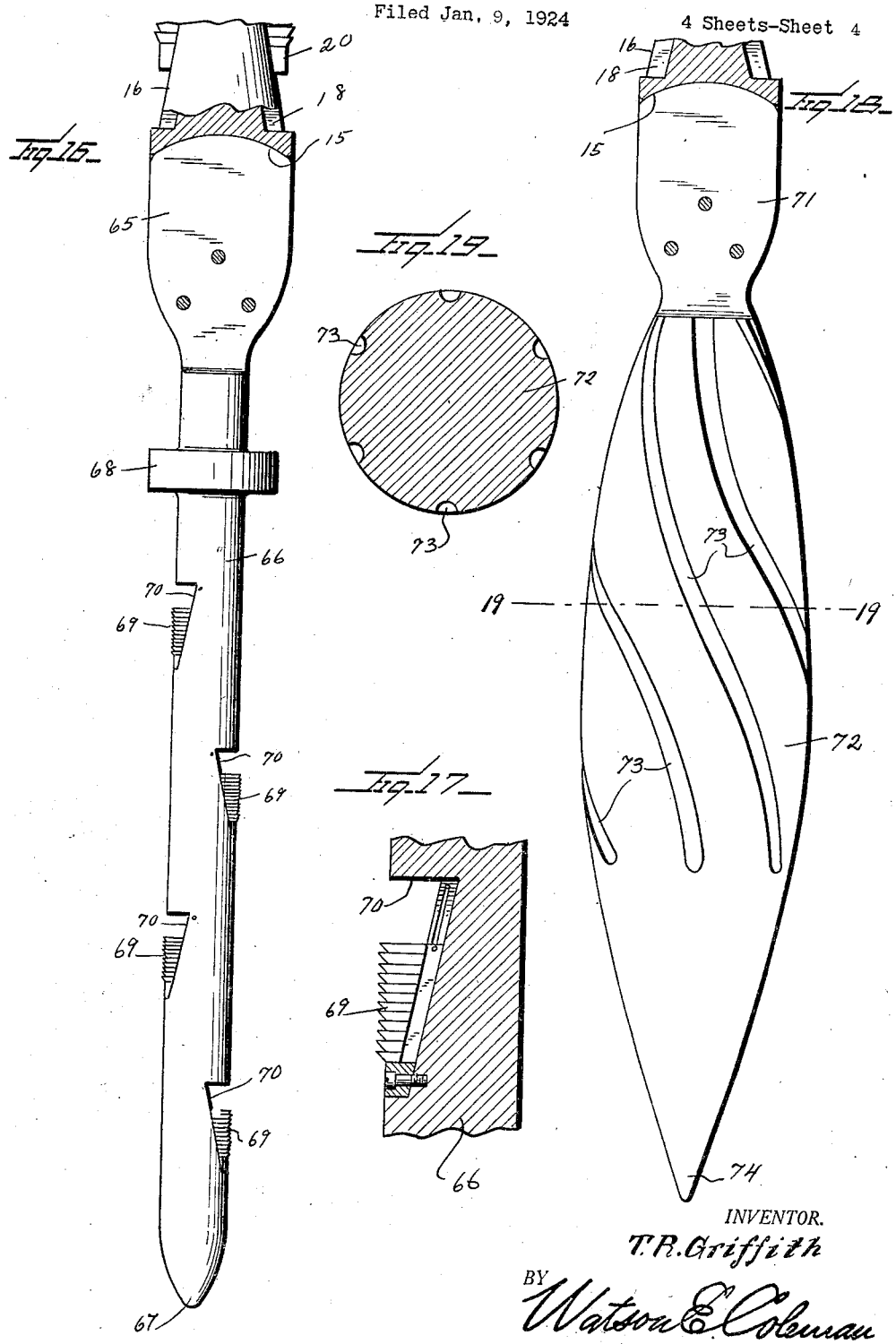

Patented Feb. 17, 1925.

1,527,130

UNITED STATES PATENT OFFICE.

THURMAN R. GRIFFITH, OF CORSICANA, TEXAS.

OIL-WELL TOOL.

Application filed January 9, 1924. Serial No. 685,235.

*To all whom it may concern:*

Be it known that I, THURMAN R. GRIFFITH, a citizen of the United States, residing at Corsicana, in the county of Navarro and State of Texas, have invented certain new and useful Improvements in Oil-Well Tools, of which the following is a specification, reference being had to the accompanying drawings.

This invention relates to oil well tools and more particularly to a fishing tool for oil wells.

An important object of the invention is to provide a device of this character which is capable of performing as great a number of the different operations of fishing as is possible.

A further object of the invention is to provide a device of this character in which the parts of the tool are readily interchangeable.

A further and more specific object of the invention is to provide as an article of manufacture a fishing tool shank adapted for engagement with the tool string of oil well drilling apparatus, the shank being in turn adapted for interchangeable engagement by a plurality of different tools each performing a certain operation or group of operations necessary in fishing.

A further object of the invention is to provide a device of this character which may be cheaply and durably constructed and in which the number of necessary parts is reduced to a minimum.

These and other objects I attain by the construction shown in the accompanying drawings, wherein for the purpose of illustration is shown a preferred embodiment of my invention and wherein:—

Figure 1 is a side elevation showing the combined casing spear and tool shank;

Figure 2 is a vertical sectional view therethrough;

Figure 3 is an enlarged detail view partially broken away to show the openings 24 through which the pin is inserted to lock the slips of the casing spear in position;

Figure 4 is a section on the line 4—4 of Figure 2;

Figure 5 is a section on the line 5—5 of Figure 2;

Figure 6 is a vertical sectional view through the device showing the fishing prongs attached thereto and illustrating the manner of employing the bail latch, a bailer being indicated in dotted lines;

Figure 7 is an enlarged sectional view on line 7—7 of Figure 6;

Figure 8 is an enlarged view on the line 8—8 of Figure 6;

Figure 9 is a sectional view through one of the prongs showing the recesses formed for mounting the slips;

Figure 10 is a detail view showing the mounting of the collar buster;

Figure 11 is a view of the casing spear with the center spear attachment applied thereto;

Figure 12 is a vertical sectional view illustrating the improved knife attachment and taken on the line 12—12 of Figure 13;

Figure 13 is a sectional view at right angles to the view of Figure 12;

Figure 14 is an enlarged sectional view on the line 14—14 of Figure 12; and

Figure 15 is a view showing the position of the knives at the time of severing a cable or rope.

Figure 16 is an enlarged detail view showing a side elevation of the tubing spear;

Figure 17 is an enlarged detail sectional view showing the mounting of the slips of the tubing spear;

Figure 18 is a detail view showing the mounting and construction of a casing swage for use with the shank;

Figure 19 is a transverse sectional view therethrough.

Referring now more particularly to the drawings, the numeral 10 generally designates a fishing tool shank, the body portion 11 of which is preferably circular in cross section. At the upper end this body portion is provided with the usual wrench receiving squares 12 and taper threaded portion 13 for engagement in a drilling stem 13ª or the like. The lower end of the body portion tapers to form a blunted rounding point 14 of the type usually employed in casing spears. This lower end is provided with a transverse slot 15 subdividing it into two arms for a purpose presently to appear.

Above this lower end the body portion adjacent the lower end thereof is provided in its side wall with upwardly and inwardly inclining flattened portions 16 formed by cutting into the body portion notches, the upper ends of which form abrupt shoulders 17. In these flattened portions are formed grooves 18 which open through the outer face of the body portion 11 at its lower end and which extend to a point in approximate alignment with the shoulders 17. In opposing side walls of these grooves pairs of aligned grooves 19 are formed, the purpose of which will presently appear. Slips 20, having their inner faces beveled at the same angle as the angle of the inclined portions to the axis of the shank 10 and their outer faces arcuately curved and provided with upwardly inclining teeth 21, are engaged against these inclining faces and have flanges 22 extending into the slots 18 thereof. Each flange 22 has formed therethrough adjacent its upper end an opening for the reception of a pin 23 of a length approximating the distance between the opposed end walls of the slots 19. Through the body portion 11 at points aligning with the opening receiving the pin 23 when the upper end of the slip is engaged against the shoulder 17 aligned openings 24 are formed permitting the insertion and removal of the pin. The slips 20 are of such construction that they will not be forced into engagement with the opening by engagement of the casing therewith, being of such size that before their upper ends abut the shoulders 17 their inner faces are arranged inwardly of the outer face of the body portion 11. Accordingly, the pin opening of the flanges 22 may only be aligned with the openings of the body 11 by manual means and the pin when inserted is in no way likely to align with these openings to become dislodged during use of the tool within the well and at the same time permitting ready removal of the pin whenever it is desired to remove the slips 20. The slots 19 terminate short of the lower end of the slot 18 and accordingly escape of the slip from its proper position by downward movement is prevented.

Above the slip receiving notches which are formed at diametrically opposed points the body portion has formed therethrough a diametrically extending tapered opening 25 which is adapted for the reception of a wedge 26, the purpose of which will hereinafter appear. The body portion has formed therein bores 27 connecting the upper ends of the slip notches with the tapered bore 25, these bores paralleling the line of movement of the slips. Pivoted to the upper end of each slip in any suitable manner is a rod 28 forming a bail for the slip and having at its upper end an eye 29 which projects into the tapered bore 25 when the slip is in the uppermost position, to which it may be moved by the engagement of the casing therewith or when the slip is positioned so that its outer face lies inwardly of the outer face of the body portion 11. Through these eyes a rod 30 may be directed to hold the slip in raised or inoperative position. The under surface of the wedge or tapered key 26 has formed therein notches 31 aligning with the bores 27 so that upward movement of the slips is not interfered with while this wedge is in position. Attention is directed to the fact that the projection of the upper ends of the rods 28 into the notches of the wedge will prevent withdrawal of this wedge and accordingly these rods serve as a means for holding the wedge locked in position. When the slips are removed from the body and it is desired to hold the wedge in position the rods 30 may be inserted to accomplish this purpose.

Mounted in the slot of the lower end of the body member upon pivots 32 having their end portions mounted in the body portion 11 at the sides of the slot are bit prongs 33. The adjacent faces of the bit prongs 33 are provided adjacent their upper ends with outstanding shoulder portions 34 which come into engagement with one another and limit the pivotal movement of the prongs in this direction. The lower ends of the prongs are thus held in spaced relation. Each lower end is slotted, as at 35, for the reception of a flange 36 formed upon a coacting slip member 37, the inner face of which inclines upwardly and inwardly and is arcuately curved and provided with upwardly and inwardly inclining teeth 38. Through the bit prong and the flange 36 a pin 39 extends which holds the flange and slip in position upon the lower end of the prong. The upper end of the slot 35 of one of the prongs is enlarged, the pin extending through this enlargement and providing a bail for a latch 40 which normally rests upon the upper surfaces of the two slips which limit its downward movement. This latch may swing upwardly to permit the passage of an article such as the bail of a bailer and after the bail has passed will swing downwardly of its own weight and prevent withdrawal of the bail. The slips 37 engage the upper end of a bailer to further assist in elevating the same. In order that the lower ends of the bit prongs may be yieldingly held together, I provide upon the outer surface of these bit prongs adjacent their upper ends downwardly inclining shoulders 41 upon which rests a ring 42 having a conical opening the walls of which coact with the shoulders. Upon the upper surface of this ring is seated a spring 43, the upper end of which abuts the ends of the tapered pin or wedge 26 either directly or through the agency of a filling ring 44, the latter being interposed between the upper end of the spring and the wedge when it is desired to increase the tension of the spring. It will be seen that the jaws or prongs are yieldable and may spread to admit an article thereto but that due to their construction they will close upon this article forcing the teeth of the slips into engagement therewith so that the article may be withdrawn from the well.

The inner faces of the bit prongs at points spaced from the lower ends thereof are provided with slots 45 receiving the flanges 46 of a pair of coacting slips 47, a pin 48 being extended through the prongs and flanges to hold the same in position in the slots. The adjacent faces of the slips 47 are concaved and provided with upwardly directed teeth, these slips being intended for engagement with small circular objects within the well, such as tools, rods or the like. The upper ends of the bit prongs extend upwardly beyond the pivots thereof for a considerable distance and between these upper ends is pivoted one end of a casing ripper 49 which is swingable through the slot 15 to project at either side of the body 11 as may be desired. The downward movement of the ripper will, of course, be limited by its engagement with the upper end of the bit prong toward which it is inclined. The purpose of this tool will be obvious to those familiar with the art.

In the construction of the tool the pins holding the slips 37 and 47 in position will be made removable so that either set thereof may be removed when its use is not desired. The pivot pins 32 of the bit prongs are likewise made removable so that the bit prongs may be readily removed and the collar buster 49 is further made removable. With these devices removed, it being of course understood that with their removal the spring is likewise removed, other tools may be inserted in the slotted lower end of the shank 10, such as the center spear 50 shown in Figure 11 or the rope or cable knife 51 as shown in Figure 12. The center spear consists of a conical downwardly tapering body portion 52 formed to provide upon the outer surface thereof upwardly and outwardly inclining teeth 53 and its purpose is to engage in the interior of tubing or the like to be forced into the casing by the weight of its attending string so that the teeth thereof engage in the material of the casing to permit the same to be withdrawn. The upper end of this tool is provided with a flattened portion 54 of a thickness equal to the width of the slot 15 and closely fits within the slot openings 55, being formed therein for the reception of the pivot pins of the collar buster and bit prongs. It is pointed out that a center spear of this character when coacting with the casing spear formed by the shank 10 serves to guide the spear into the casing if the casing be leaned to one side or the other of the hole, it of course being understood that the fine point 56 of the center spear is much more readily engaged in the top opening of the casing than the relatively blunt point of the casing spear would ordinarily be.

The rope knife 51 consists of a downwardly tapering body 57 having formed in one side thereof a slot 58 for the guidance of the rope or cable, this slot so forming the body that at its bottom end it is substantially U-shaped. In the walls of the slot 58 other slots 59 are formed in which are disposed the shank portions 60 of coacting knives 61. One of these knives is held stationary by pins extending through the walls of the tool and the other of these knives is slidable in its slot. The last named knife has its shank portion 60 extended upwardly from the tool to form a stem $60^a$ operating within the slot and providing an elongated bearing surface for its knife. The slots 59 are preferably dovetail slots and so constructed that they are closed at their lower ends, as indicated at 62, the knives being removable through the upper ends of the slots for replacement. The closed lower ends of the slots limit the downward movement of the knives and particularly the downward movement of the movable knife. The upward movement of the movable knife is limited by a removable pin $62^a$ to prevent accidental disengagement of this knife when the rope knife is being moved downward upon the rope or cable. The knives 61 are so constructed that when they are at the same level and adjacent faces come together and since these adjacent faces form cutting edges, it will be obvious that the cable or rope held therebetween will be severed. The upper end of the tool is provided with a flattened shank 63 for engagement in the slot 15 and in all respects similar to the shank 54 of the center spear 50. In the use of a device of this character the rope or cable to be cut, which is usually fast to tools stuck in the well, has its upper end passed into the slot 58 by the guide members 64 extending across the slot, these guide members serving at all times to hold the rope or cable in alignment with the blades. The tool is then allowed to slide down the cable until it comes into contact with the tools attached to the cable when it is drawn upwardly with the result that the knife which has moved upwardly by its engagement with the rope is moved downwardly so that it aligns with the other of the knives and the rope or cable is severed.

If tubing is to be handled a tubing spear, such as shown in Figure 16 may be employed. This spear consists of a shank 65 adapted for engagement in the slot 15 and an elongated rod applied thereto, as indicated at 66. The lower end of this rod is pointed, as at 67, to permit its ready engagement in tubing which is to be withdrawn and the rod is provided adjacent its upper end with an outstanding shoulder 68 limiting its movement into the engaged tubing. Between the pointed end 67 and shoulder 68 the rod has applied thereto a plurality of gravity operated slips 69 which are slidably mounted in notches 70 formed in the spear and which when in their uppermost position are concealed within the spear. It will be obvious that the slips will yield during passage of the spear into the tubing but when the spear is moved upwardly will move downwardly in their notches and come into engagement with the inner walls of the tubing causing the same to be elevated with the spear. Where a casing is to be handled which has become deformed or broken by the engagement therewith of tools or a cave-in of the well, a casing swage, such as shown in Figure 18, may be employed. This swage embodies a shank 71 for engagement in the slot 15 as a means of attachment and has below this shank an ovate body 72, this body being grooved, as at 73, the grooves extending spirally upon the body. The smaller or pointed end 74 of the body 72 is downwardly directed. This end may be engaged in the end of the deformed casing when by rotating the swage this casing will be opened out so that the casing spear may be engaged therewith if so desired.

It will be obvious that by the construction of the casing spear employed the casing spear ceases to have a single function but becomes a shank by means of which a number of tools for similar purposes may be attached to the tool string, thus greatly expediting fishing operations. For example, if a cave-in occurs resulting from breakage of a portion of the casing and in this cave-in a bailer is caught, the following method would be employed. The shank would be attached to the tool string and to this shank the rope knife would be attached and slid down the cable until the bailer was reached when the cable would be severed and withdrawn. This having been effected, the rope knife is removed and the bit prongs substituted therefor, the slips 37 and latch 40 being employed therewith. The tool is again lowered into the well and held by engagement of the latch with the bail or by the engagement of the slips 37 with the bailer proper and the bailer is withdrawn leaving the hole free for casing removal. In order to remove the casing it will simply be necessary that the bit prongs and the spring be removed and the device is ready for use as a casing spear. If the disengaged portion of the casing is inconveniently located and difficult to engage with the blunt nose of the spear, the center spear 50 may be brought into play to guide the casing spear into the casing. If it is found that the casing is too firmly embedded at its lower end to permit its being pulled until the hole has been cleaned, upper sections thereof may be broken away by the use of the collar buster 70 and such upper sections removed independently.

I claim :—

1. As an article of manufacture, a combined casing spear and fishing tool shank, comprising a body portion having the usual bluntly tapered lower end, upper end adapted for engagement with the tool string and having slips for engagement with the casing, the tapered lower end portion of the body being provided with a vertical diametrically extending slot.

2. As an article of manufacture, a combined casing spear and fishing tool shank, comprising a body portion having the usual bluntly tapered lower end, upper end adapted for engagement with the tool string and having slips for engagement with the casing, the tapered lower end of the body portion being provided with a tool shank receiving slot and means for retaining the tool shank in the slot.

3. As an article of manufacture, a combined casing spear and fishing tool shank, comprising a body portion having the usual bluntly tapered lower end, upper end adapted for engagement with the tool string and having slips for engagement with the casing, the tapered lower end portion of the body being provided with a vertical diametrically extending slot forming spaced arms, said arms being provided with aligned pairs of openings for the reception of pivot pins.

4. The combination with a casing spear comprising a body portion having the usual bluntly tapered lower end, upper end adapted for engagement with the tool string and slips for engagement with the casing, said slips in one position thereof being inoperative and having their gripping faces disposed interiorly of the plane of the periphery of the body, of means for maintaining said slips in such inoperative position, comprising pins insertible through openings formed in said body and an extension formed upon each of said slips having an opening therein for engagement by said pins.

5. A casing spear comprising a body portion having a tapered lower end and an upper end adapted for engagement with the tool string, the body portion having upwardly and inwardly inclining flattened portions, slots formed in the vertical walls of said flattened portions, slips having arcuate outer surfaces provided with upwardly inclining teeth abutting said flattened portions and having flanges extending into the slots thereof, opposed slots communicating with the first named slots and pins extending through the flanges of said slips and having their end portions disposed in the opposed slots.

6. A casing spear comprising a body portion having a tapered lower end and an upper end adapted for engagement with the tool string, the body portion having upwardly and inwardly inclining flattened portions, slots formed in the vertical walls of said flattened portions, slips having arcuate outer surfaces provided with upwardly inclining teeth abutting said flattened portions and having flanges extending into the slots thereof, opposed slots communicating with the first named slots and pins extending through the flanges of said slips and having their end portions disposed in the opposed slots, the body portion being provided with aligned pairs of openings with which said pins are alignable in one position of their associated slip to permit removal of the pin.

7. A casing spear comprising a body portion having a tapered lower end and an upper end adapted for engagement with the tool string, the body portion having upwardly and inwardly inclining flattened portions, slots formed in the vertical walls of said flattened portions, slips having arcuate outer surfaces provided with upwardly inclining teeth abutting said flattened portions and having flanges extending into the slots thereof, opposed slots communicating with the first named slots and pins extending through the flanges of said slips and having their end portions disposed in the opposed slots, the body portion being provided with aligned pairs of openings with which said pins are alignable in one position of their associated slip to permit removal of the pin, said slips when in the last named position having their outer faces disposed inwardly of the periphery of the body portion of the spear.

8. In a casing spear, a body portion having a bluntly tapering lower end, an upper end adapted for engagement with the tool string and slips shiftable upon the body portion to operative and inoperative positions and normally assuming operative position by gravity and means for maintaining said slips in inoperative position, the lower end of said body portion being provided with a tool shank receiving slot forming arms, a pair of pivot pins having their ends engaged in said arms, a pair of depending prongs mounted upon said pivot pins and provided on adjacent faces thereof with portions contacting in one position of the arms to limit movement of the arms toward one another, means yieldably maintaining the arms with said faces in engagement one with the other, and a pair of slips carried by said arms.

9. In a casing spear, a body portion having a bluntly tapering lower end, an upper end adapted for engagement with the tool string and slips shiftable upon the body portion to operative and inoperative positions and normally assuming operative position by gravity and means for maintaining said slips in inoperative position, the lower end of said body portion being provided with a tool shank receiving slot forming arms, a pair of pivot pins having their ends engaged in said arms, a pair of depending prongs mounted upon said pivot pins and provided on adjacent faces thereof with portions contacting in one position of the arms to limit movement of the arms toward one another, means yieldably maintaining the arms with said faces in engagement one with the other, and a pair of slips carried by said arms, and a latch pivoted to one of said prongs to swing in a vertical plane, downward movement of said latch being limited by its engagement with the upper surfaces of said slips.

10. In a casing spear, a body portion having a bluntly tapering lower end, an upper end adapted for engagement with the tool string and slips shiftable upon the body portion to operative and inoperative positions and normally assuming operative position by gravity and means for maintaining said slips in inoperative position, the lower end of said body portion being provided with a tool shank receiving slot forming arms, a pair of pivot pins having their ends engaged in said arms, a pair of depending prongs mounted upon said pivot pins and provided on adjacent faces thereof with portions contacting in one position of the arms to limit movement of the arms toward one another, means yieldably maintaining the arms with said faces in engagement one with the other, and a pair of slips carried by said arms, said means for maintaining the arms in said position comprising a spring surrounding the body of the casing spear, the body having means against which the upper end of the spring abuts, the outer faces of said prongs adjacent the upper end thereof being outwardly inclined and a tapered collar mounted upon the prongs and abutting the tapered portions thereof and against which the lower end of the spring abuts.

In testimony whereof I hereunto affix my signature.

THURMAN R. GRIFFITH.